United States Patent

[11] 3,632,982

[72] Inventor Harrison K. Linger
 Louisville, Ky.
[21] Appl. No. 876,240
[22] Filed Nov. 13, 1969
[45] Patented Jan. 4, 1972
[73] Assignee General Electric Company

[54] COMBINATION ELECTRIC GRIDDLE AND COOKTOP
 7 Claims, 4 Drawing Figs.

[52] U.S. Cl. ................................................. 219/447,
 99/282, 219/444, 219/479, 219/541
[51] Int. Cl. ..................................................... H05b 3/68
[50] Field of Search........................................... 219/447,
 446, 445, 444, 463, 403, 541, 476–480; 99/390, 282

[56] References Cited
 UNITED STATES PATENTS

| | | | |
|---|---|---|---|
| 2,584,187 | 2/1952 | Crist | 219/479 X |
| 2,786,929 | 3/1957 | Michaelis | 219/445 |
| 2,931,873 | 4/1960 | Lang | 219/444 |
| 3,051,819 | 8/1962 | Smith | 219/444 |
| 3,218,955 | 11/1965 | Lorang | 99/282 |
| 3,222,115 | 12/1965 | Urbank | 219/444 X |
| 3,231,718 | 1/1966 | Vasile | 219/465 |
| 3,525,852 | 8/1970 | Filipak | 219/444 |

Primary Examiner—Volodymyr Y. Mayewsky
Attorneys—Richard L. Caslin, Harry F. Manbeck, Jr., Frank L. Neuhauser, Oscar B. Waddell and Joseph B. Forman ABSTRACT: A surface cooktop mounted on a free-standing range or adapted to be supported in the kitchen counter as a built-in cooktop. A plurality of surface heating units are mounted in the cooktop. There is a shallow recess formed in the cooktop and the recess is open at the front edge of the cooktop. A reversible electric griddle is adapted to be seated within the recess either in a first concealed position having a top work surface substantially flush with the top surface of the cooktop or in a second heating position where the griddle is turned over to expose an electric griddle surface. An electrical resistance heating element is embedded in the griddle and it has terminals along the back edge of the griddle which are adapted to fit into an electrical receptacle mounted at the rear edge of the recess so as to supply electric power to the griddle. An electric thermostat is furnished with the cooktop for governing the temperature levels of the griddle. This thermostat includes a temperature sensor mounted within the griddle and connecting means between the thermostat and the sensor as well as between the griddle and the cooktop for making and breaking connection between the thermostat and the sensor.

PATENTED JAN 4 1972
3,632,982
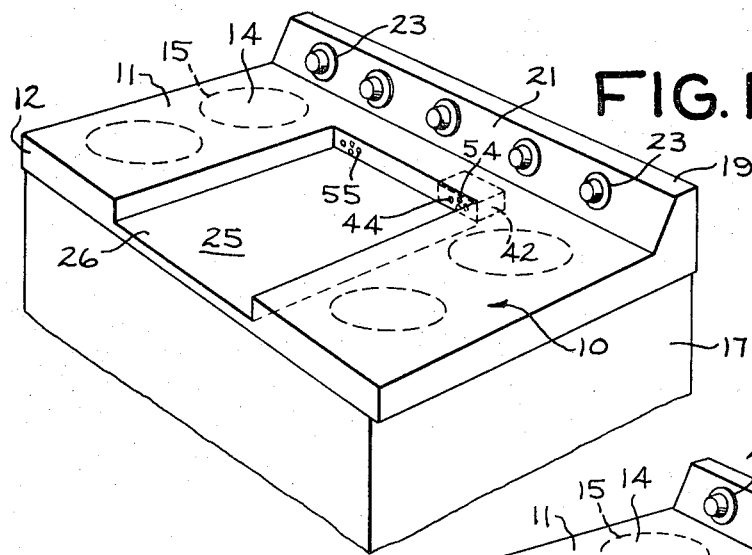
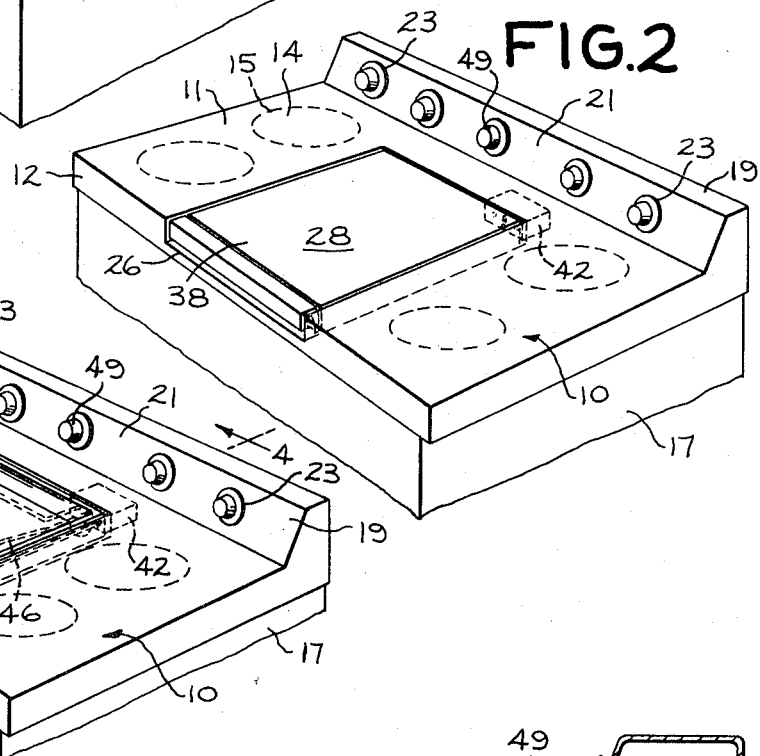
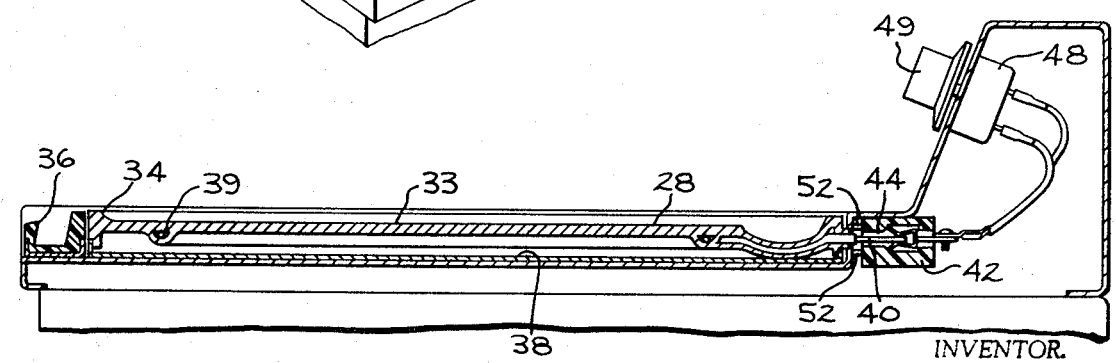
INVENTOR.
HARRISON K. LINGER
BY Richard L. Caslin
HIS ATTORNEY 3,632,982

COMBINATION ELECTRIC GRIDDLE AND COOKTOP

BACKGROUND OF THE INVENTION

It is desirable in the design of a cooktop of a domestic range or a built-in cooktop to have some available work space between the electric surface heating units or the gas surface burners. This is important to the person using the cooktop so that when the food has been cooked the cooking utensil may be removed from the heating unit or burner and left to rest on the work surface until the food has cooled down sufficiently so that it may be served directly on the plates or into serving dishes to be placed on the table. It is not well to place the hot pans onto the average kitchen counter because the counter material of laminated plastic, or the like, may not withstand the high temperatures without scorching and attendant permanent damage to the surface. There is also a growing trend today to provide the surface cooktops with a large griddle which should be capable of different heating rates as well as having its temperature controlled automatically. Usually these griddles are placed over one and sometimes two of the surface heating units, and there is automatic surface unit control associated with the units for governing the temperature of the griddle. Such a cooking feature adds immeasurably to the convenience and speed of cooking for large families and gatherings especially for the breakfast meal of bacon, eggs, pancakes, sausage, toast, as well as fish, hamburgers, ham, rolls, etc. One difficulty with the use of a griddle in this manner is that it ties up the use of some of the surface heating units so that only very few side dishes can be prepared at the same time.

Another griddle design is one where the griddle is incorporated in the cooktop thereby using up most of the available work space.

The principle object of the present invention is to provide an electric cooktop with a reversible griddle which has a first concealed position with a top work surface generally flush with the top surface of the cooktop and a second heating position exposing a griddle surface that is capable of being heated.

A further object of the present invention is to provide a reversible griddle of the class described with convenient means for making an electrical connection thereto when the griddle is to be heated, as well as to complete the temperature control system for governing both the rate of heating and the maximum temperature to be reached by the griddle.

A still further object of the present invention is to provide a reversible griddle for a surface cooktop such that the griddle in its concealed position is set into a recess in the cooktop so that a top work surface is substantially flush with the top surface of the cooktop.

SUMMARY OF THE INVENTION

The present invention, in accordance with one form thereof, relates to a surface cooktop that includes a plurality of surface heating means supported thereon and having control means for governing the energization of the heating means. A shallow recess is formed in a cooktop. A reversible electric griddle having integral heating means is adapted to be seated within the recess in either a first concealed position to have its top work surface substantially flush with the top surface of the cooktop or a second inverted position with an electrically heated griddle surface exposed. Means are provided for making an electrical connection with the griddle when the griddle is in its second heating position as well as for assembling a temperature control means for governing the temperature levels of the griddle.

BRIEF DESCRIPTION OF THE DRAWINGS

My invention will be better understood from the following description taken in conjunction with the accompanying drawings and its scope will be pointed out in the appended claims.

FIG. 1 is a fragmentary perspective view of a surface cooktop shown with a shallow recess designed to receive the reversible griddle of the present invention, where the cooktop may either be a built-in cooktop mounted in a kitchen counter, or it could be assembled on the body of a free-standing or slide-in range;

FIG. 2 is a perspective view similar to that of FIG. 1 except that the reversible griddle is shown concealed in the shallow recess in the center of the cooktop thereby providing a top work surface that is substantially flush with the top surface of the cooktop;

FIG. 3 is a fragmentary perspective view similar to that of FIGS. 1 and 2 except that the reversible griddle has been inverted from the position shown in FIG. 2 to expose a griddle surface that is capable of being heated, and there is a dotted line showing of an electric resistance heating element embedded in the griddle as well as a temperature sensor that is part of the temperature control system of the griddle;

FIG. 4 is a right side, cross-sectional elevational view on a slightly enlarged scale through the cooktop and griddle, and taken on the line 4—4 of FIG. 3.

DESCRIPTION OF THE PREFERRED EMBODIMENT

Turning now to a consideration of the drawings, and in particular to FIG. 1, there is shown a top cooking surface or cooktop 10 which is of generally fabricated sheet metal construction having a top working surface 11 of generally rectangular configuration and shallow depth 12 so as to create a shallow boxlike construction with a wiring chamber (not shown) within the box so that power lead wires may be connected to each one of the plurality of surface heating units 14 which are mounted in suitable openings 15 in the top of the cooktop as is well known in this art. While this invention has been shown incorporated in an electric surface cooktop, it is understood that the invention has equal utility on a gas surface cooktop. The cooktop 10 is shown mounted on the top of a supporting structure 17 which has no clear identifying features, but it will be understood by those skilled in this art that this supporting structure 17 could either be a standard kitchen cabinet or it could be the body or cabinet of a domestic free-standing or slide-in range. It is not felt necessary to limit this invention to use with a particular type of supporting structure for the cooktop, since the invention is in the cooktop per se.

A backsplash 19 is designed along the back edge of the cooktop 10 for supporting a control panel 21 on the front side thereof in which are supported a control means or selector switch 23 for controlling the rate of energization of each of the surface heating units 14.

The preferred embodiment of the present invention incorporates a shallow recess 25 centrally located in the cooktop, that is open at the front edge of the cooktop 10, as at 26. The shallow recess 25 could also be located at the side of the cooktop, if desired. In other words, the heating units 14 could all be located on one side of the recess rather than being positioned on both sides of it. The open front 26 allows the user to maintain the griddle in a level position as it is disengaged from the electrical receptacle 42 and removed from recess 25. This feature is particularly desirable when the griddle surface 33 contains hot grease. This recess 25 is adapted to be filled by a reversible griddle 28 which has two positions. The first position or concealed position is that shown in FIG. 2, while the second position or the heated position is shown in FIG. 3. As is best seen in the cross-sectional elevational view of FIG. 4, the griddle 28 has as its main component a cast aluminum griddle surface 33 that is furnished with an upward peripheral flange 34 so that grease will be contained on the griddle and will not tend to drain off the sides. The front edge of the griddle is provided with a handle 36 of molded insulating material, and extending from one side to the other of the griddle for esthetic and convenience reasons. The underside of the griddle 28 is furnished with a smooth, sheet metal panel 38, as is best seen when the griddle is in its first, concealed position of FIG. 2. This panel 38 serves as a top work surface that is substantially flush with the top surface of the cooktop 10 when the griddle is in its first position of FIG. 2. Embedded in the underside of the griddle surface 33 is an electrical resistance heating element 39 of looped configuration, as is best seen in dotted lines in FIG. 3, for applying controlled heat to the griddle surface 33. The two ends of the looped resistance heating element 39 are brought together at the rear edge of the griddle adjacent the right corner thereof, as seen in FIG. 3, and they terminate in exposed prongs 40 of short length, as is best seen in FIG. 4.

A suitable electrical receptacle 42 is mounted beneath the top surface of the cooktop 10 at the rear edge of the recess 25, and it has sockets 44 for receiving the prongs 40 of the griddle. Also located within the griddle 28 is a temperature sensor 46 shown in dotted line in FIG. 3. The sensor 46 forms one element of an electric selector switch and thermostat system that has a responder 48 mounted in the backsplash 19. The responder includes a manual control knob 49 for varying the temperature level of the griddle as well as serving as a selector switch for governing the rate of heat of the griddle heating element 39. This temperature sensor 46 is provided with a pair of lead wires (not shown) that terminate in a pair of vertically spaced prongs 52 that are centered between the pair of horizontally spaced prongs 40 of the terminals of the heating element 38. Suitable sockets (FIG. 1) are formed in the receptacle 42 for mating engagement with this second set of prongs 52. Suitable lead wires (not shown) would extend from the receptacle 42 to the responder 48.

Because the prongs 40 and 52 extend outwardly from the rear edge of the reversible griddle 28, some provision must be made to accommodate these projections when the griddle is inverted into its first concealed position of FIG. 2. Looking at FIG. 1 of the drawings, you will notice clearance means 55 in the form of dummy sockets for receiving the pair of prongs 40 and the pair of prongs 52, such that the top work surface 38 is an unheated panel when the housewife wishes to work over the panel in the preparation and serving of food. Other provisions such as cutouts, could be made in the rear edge of the recess in order to avoid interference with the prongs. In operation, the griddle would be grasped by the handle 36 and slid into or out of the recess 25.

It is understood that if the shallow recess 25 were not open at the front as at 26, the handle 36 would preferably be redesigned so that it could be grasped in both positions of the reversible griddle (concealed and heating positions). Also, the recess 25 should have clearance so that the fingers could grasp the handle. The removal of the griddle would be slightly more difficult if the front of the recess 25 were closed. Also, the possibility of grease spillage could be a hazard. Modifications of this invention will occur to those skilled in this art therefore it is to be understood that this invention is not limited to the particular embodiments disclosed but that it is intended to cover all modifications which are within the true spirit and scope of this invention as claimed.

What I claim as new and desire to secure by Letters Patent of the United States is:

1. A surface cooktop having a plurality of surface heating means supported therewith, control means for governing the energization of the heating means, a shallow recess formed in the cooktop, a reversible electric griddle having integral electric heating means and adapted to be installed within the recess into a first position to have its top work surface substantially flush with the top surface of the cooktop and a second reversed position with an electrically heated griddle surface exposed, an electrical receptacle mounted adjacent the rear edge of the griddle, and a cooperating plug connector for engagement in the said receptacle so that the griddle may be quickly connected and disconnected with relation to a source of electrical power, and temperature control means comprising a manually settable means remote from the griddle for governing the heating rate of the griddle.

2. A surface cooktop having a plurality of electric surface heating units mounted thereon, control means for governing the energization of the heating units, and a shallow recess formed in the cooktop, a reversible electric griddle having integral electric heating means and adapted to be seated within the recess in a first concealed position to have a top (decorative) work surface substantially flush with the top surface of the cooktop, and a second heating position where the griddle is reversed to expose a griddle surface, an electrical receptacle mounted in the cooktop adjacent the rear edge of the cooktop recess, and prongs formed on the rear edge of the griddle for connection to the said receptacle, and clearance means in the cooktop for receiving the said prongs when the griddle is in its first concealed position, and temperature control means comprising a manually settable means remote from the griddle for governing the heating rate of the griddle.

3. An electric cooktop having a plurality of surface heating units mounted thereon, control means for governing the energization of the heating units, and a shallow recess formed in the cooktop away from the said heating units, a reversible electric griddle adapted to be seated within the recess in either a first concealed position exposing a top work surface that is substantially flush with the top of the cooktop, or a second heating position where the griddle is turned over to expose a heated griddle surface, an electrical resistance heating element embedded in the said griddle and having terminal means represented by prongs extending out the rear edge of the griddle, an electrical receptacle mounted at the rear edge of the said recess for receiving the said prongs and adapted to supply electrical power to the griddle, and an electric thermostatic temperature control means for the griddle comprising a temperature sensor positioned in the griddle and having connecting means associated with the said prongs, and a manually settable thermostat mounted remote from the griddle with connecting means associated with the said receptacle, whereby said temperature sensor and said thermostat are also electrically connected through said receptacle.

4. A surface cooktop as recited in claim 3 wherein the rear edge of the cooktop recess is provided with clearance means for accommodating the said prongs and connecting means of the temperature sensor when the griddle is placed in its first concealed position.

5. An electric built-in cooktop having a large top working surface with a plurality of surface heating units mounted therein, control means for governing the energization of the heating units, and a shallow recess formed in the cooktop and open at the front edge of the cooktop, a reversible electric griddle adapted to be seated within the recess in either a first concealed position where the griddle has exposed a top work surface that is substantially flush with the top working surface of the cooktop, or a second heating position where the griddle is inverted to expose a griddle surface that is capable of being heated, an electrical resistance heating element embedded in the electric griddle and having exposed terminals at the rear edge of the griddle, an electrical receptacle mounted in the rear edge of the recess of the cooktop for receiving the exposed terminals of the griddle when the griddle is in its second heating position, and control means remote from the griddle for governing the energization of the said heating element.

6. An electric built-in cooktop as recited in claim 5 wherein the electric griddle is positioned adjacent the center of the cooktop and the surface heating units are at either side of the griddle, and a backsplash arranged along the rear edge of the cooktop, the said control means for the surface unit and the griddle being located within the backsplash.

7. An electric built-in cooktop as recited in claim 5 wherein the control means for the griddle heating element comprises an electric thermostat with a temperature sensor located within the griddle and lead wires joining the thermostat with the said sensor, and coupling means in the lead wires between the griddle and the cooktop, said coupling means being associated with the terminals and receptacle of the griddle heating element, and an adapter mounted in the rear edge of the cooktop recess for receiving the exposed terminals of the griddle when the griddle is its first concealed position.

\* \* \* \* \*